(12) United States Patent
Lee et al.

(10) Patent No.: US 10,537,981 B2
(45) Date of Patent: Jan. 21, 2020

(54) ITEM PICK UP SYSTEM

(71) Applicant: NIKE, Inc., Beaverton, OR (US)

(72) Inventors: Kuo-Hung Lee, Douliou (TW); Yu-Jui Liu, Douliou (TW); Hung-Yu Wu, Douliou (TW)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 15/978,989

(22) Filed: May 14, 2018

(65) Prior Publication Data
US 2018/0326561 A1    Nov. 15, 2018

Related U.S. Application Data

(60) Provisional application No. 62/506,385, filed on May 15, 2017.

(51) Int. Cl.
*B25J 15/06* (2006.01)
*B25B 11/00* (2006.01)
*B25J 15/00* (2006.01)
*A43D 63/00* (2006.01)

(52) U.S. Cl.
CPC .......... *B25B 11/005* (2013.01); *B25J 15/0052* (2013.01); *B25J 15/065* (2013.01); *B25J 15/0625* (2013.01); *B25J 15/0658* (2013.01); *B25J 15/0675* (2013.01); *A43D 63/00* (2013.01); *B25J 15/0061* (2013.01)

(58) Field of Classification Search
CPC .. B25J 15/065; B25J 15/0625; B25J 15/0052; B25J 15/0658; B25J 15/0675; B25J 15/0061; B25B 11/005

USPC .................................................... 294/186
See application file for complete search history.

(56) References Cited

U.S. PATENT DOCUMENTS

| | | | |
|---|---|---|---|
| 3,865,359 A * | 2/1975 | Caroli | B25B 11/005 269/21 |
| 8,146,640 B2 | 4/2012 | Cartabbia | |
| 8,696,043 B2 * | 4/2014 | Regan | B25J 15/0675 294/188 |
| 8,858,744 B2 * | 10/2014 | Regan | B25J 15/0675 156/73.1 |
| 9,833,909 B2 * | 12/2017 | Vaughn | B25J 15/0625 |
| 2009/0271914 A1 | 11/2009 | Bauer | |
| 2010/0040450 A1 * | 2/2010 | Parnell | B25J 15/0052 414/752.1 |

(Continued)

FOREIGN PATENT DOCUMENTS

| | | | | |
|---|---|---|---|---|
| DE | 202014100337 U1 * | 5/2015 | .......... | B25J 15/0616 |
| DE | 102014215102 A1 * | 2/2016 | .......... | B25J 15/0052 |

(Continued)

*Primary Examiner* — Gabriela M Puig
(74) *Attorney, Agent, or Firm* — Shook, Hardy & Bacon LLP

(57) ABSTRACT

An apparatus for picking up and positioning an item includes a vacuum assembly capable of applying a suction force to the item. The apparatus further includes an item engaging plate positioned adjacent the vacuum assembly. The apparatus still further has a blocking member positioned adjacent the vacuum assembly. The blocking member is capable of interrupting the suction force. The blocking member is positionable in a first position allowing the item to be picked up and in a second position interrupting the suction force to assist disengagement of the item.

19 Claims, 11 Drawing Sheets

(56) References Cited

U.S. PATENT DOCUMENTS

| | | | | |
|---|---|---|---|---|
| 2013/0125721 A1* | 5/2013 | Gallucci | ............... | B26D 5/00 |
| | | | | 83/98 |
| 2015/0061310 A1* | 3/2015 | Yu | ............... | B25J 15/0616 |
| | | | | 294/185 |
| 2018/0339666 A1* | 11/2018 | Sander | ............... | B23K 26/40 |

FOREIGN PATENT DOCUMENTS

| | | | |
|---|---|---|---|
| EP | 2594670 A2 | | 5/2013 |
| GB | 1236504 A | | 6/1971 |
| JP | 2003142896 A | * | 5/2003 |

* cited by examiner

ITEM PICK UP SYSTEM

CROSS-REFERENCE TO RELATED APPLICATIONS

This application claims the benefit of U.S. Provisional Application No. 62/506,385, entitled "Item Pick Up System," and filed May 15, 2017. The entirety of the aforementioned application is incorporated by reference herein.

TECHNICAL FIELD

Aspects hereof relate to a system for picking up and placing items. More particularly, the present invention relates to a pickup system that uses a vacuum force to pick up and place the item, for example for construction of a shoe upper.

BACKGROUND

While automated manufacturing processes have benefited a number of industries, the automated manufacturing of soft goods made from pliable items has proven challenging to automate. For example, the manufacturing of shoes and, more particularly, shoe uppers, has long involved a large amount of hand labor. Because shoe uppers are often formed largely or entirely from multiple pliable items that are affixed together to form the completed shoe upper, even the fundamental manufacturing operation of picking up a part for a shoe upper and appropriately placing that part relative to other components has been a challenge to automate.

BRIEF SUMMARY

Aspects hereof provide automated systems to pick up and place pliable items. More particularly, the present invention relates to systems that use a suction force to pick up and place one or more pliable items. Pliable items picked up and placed using apparatuses, systems and methods in accordance with the present invention may particularly comprise components of a soft good, such as a shoe upper.

Aspects include an apparatus for picking up and positioning an item including a vacuum assembly capable of applying a suction force to the item. The apparatus further includes an item engaging plate positioned adjacent the vacuum assembly. The engaging plate includes at least one aperture formed therein so that the suction force can be applied to the item through the aperture. The apparatus still further has a blocking member positioned adjacent the engaging plate. The blocking member is capable of interrupting the suction force flowing through the aperture of the engaging plate. The blocking member is positionable in a first position allowing the item to be picked up and a second position interrupting the suction force to assist disengagement of the item from the engaging plate.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
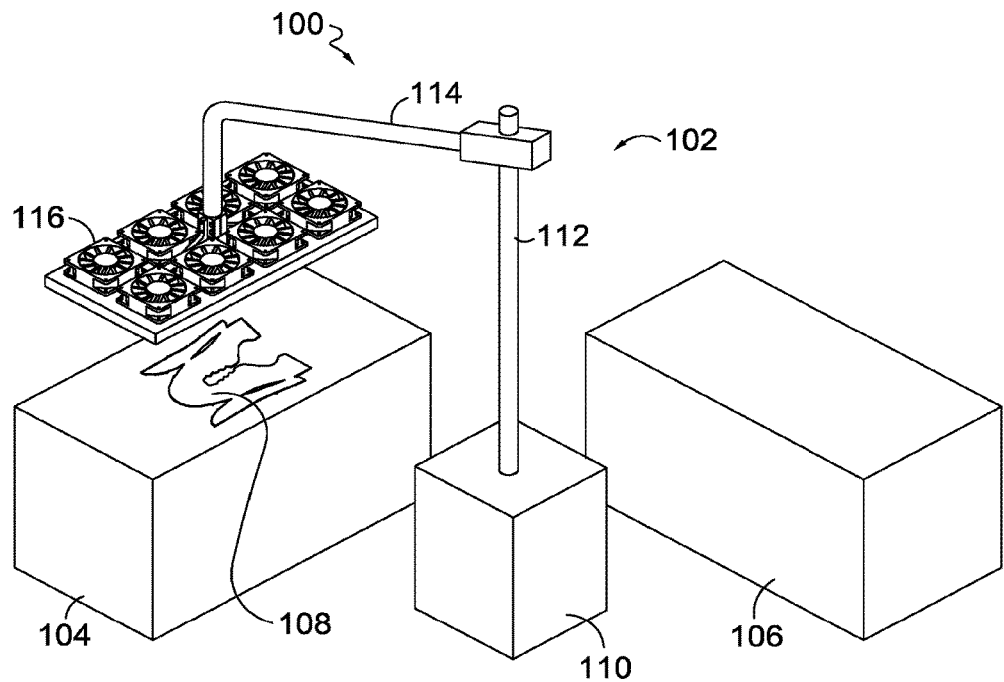
FIG. 1 depicts a perspective view of an exemplary pick up system in a first position, in accordance with exemplary aspects hereof.

Aspects hereof provide apparatuses, systems and/or methods to pick up and place one or more items, such as a piece of material or fabric. A vacuum structure has been used in the past to apply a suction force to an item so that the item engages the structure and can be moved from one position to another by for example a robotic arm. However, often it is difficult to precisely turn the suction between the "on" and "off" positions. This results in imprecise placement of an item. Thus, there is a need to precisely interrupt the suction force to result in more precise placement of the item. Additional problems with existing pick up heads include attraction deficiencies, especially with electrostatic pick up heads. More specifically, an electrostatic pick up head uses static electricity to provide adhesion between the head and an item to be picked up. Often, because of material construction, electrostatic adhesion is less than desirable. It is advantages to have a pick up head with both an electrostatic capability and a suction force capability. When there is a suction force capability with a head, the ability to precisely control the suction force is important for the precise placement of an item.

In a first aspect, an apparatus for picking up and positioning an item is provided that includes a vacuum assembly capable of applying a suction force to the item. The apparatus further includes an item engaging plate positioned adjacent the vacuum assembly and having at least one aperture formed therein so that the suction force can be applied to the item through the aperture. A blocking member is positioned adjacent the engaging plate and is capable of interrupting the suction force flowing through the aperture of the engaging plate. Still further, the blocking member is positionable in a first position which allows the item to be picked up and a second position that interrupts the suction force to assist disengagement of the item from the engaging plate.

Another aspect provides an apparatus for moving an item from one location to another location including a mechanical arm capable of moving from one location to another. The apparatus includes a pick up head coupled to the mechanical arm that is capable of engaging and disengaging the item. The pick up head includes an engaging plate for directly contacting the item. The engaging plate is divided into a plurality of independently actuated pick up zones. Each zone has at least one aperture formed therein. The pick up head also includes a vacuum mechanism capable of providing a suction force to each of the pick up zones. The pick up head further includes a plurality of independently actuated blocking members. Each blocking member is associated with one of the pick up zones and is capable of being independently actuated between an open position allowing the suction force to pass through the respective zone and a closed position interrupting the suction force at the respective zone.

Methods are provided for positioning an item from one location to another location using a pick up head having a plurality of pickup zones and a vacuum mechanism. In an exemplary method, a suction force is selectively applied to one or more of the pickup zones to pick up the item. Still further the suction force is selectively interrupted to one or more of the pick up zones to disengage the item from the pick up head.

Systems and methods in accordance with the aspects hereof may provide a tool head positionable in three dimensions to engage an item, move the item, and place the item at a different location. A variety of apparatuses, such as robotic arms, x-y tables, swinging arms, and the like, may be employed to position a tool head in three dimensions. Further, the positioning of a tool head in two dimensions comprising a plane substantially parallel to the plane defined by the item may be performed independent from movement of the tool head relative to a line perpendicular to that plane. For example, an x-y table may be used to position a tool head at a desired location in a horizontal plane. Meanwhile, the tool head may be moved to various heights relative to the x-y table (or any other point of reference, such as a surface holding or receiving an item) independent from its horizontal positioning. Further, a tool head may be rotatable to permit an item to be rotated while retained in order to place the item at the placement location with a desired orientation. The desired placement location at which an item is placed using systems and methods in accordance with aspects hereof may be defined relative to other components of a fully or partially assembled product, such as a shoe upper.

A variety of systems may be used to define and/or identify the locations at which a tool head should engage and/or disengage an item. For example, vision systems utilizing cameras, lasers, or other types of detectors may be used to identify items to be picked up and/or to locate the position at which to ultimately place the item. Alternatively/additionally, a computing device may be provided with predetermined locations to pick up and/or place an item in controlling the operations of systems and/or methods in accordance with aspects hereof. Any type of predefined location system, location detection system, or other technology may be used to determine and/or define a starting location (and orientation) to pick up an item and/or a placement location (and orientation) to place an item in accordance with the aspects hereof.

With reference to FIG. 1, an exemplary pick up system 100 is depicted in accordance with aspects hereof. The system 100 includes a rotatable mechanical arm 102 capable of rotating between a first manufacturing location 104 and a second manufacturing location 106. The mechanical arm 102 can be a robotic arm controlled by a computer processor or controlled remotely by a manual operator, or in any other suitable manner. The locations 104 and 106 can be any suitable locations in a manufacturing process, for instance locations in the manufacturing of a shoe upper. The pick up system 100 can be used to move an item 108, for instance a shoe upper part, from the location 104 to the location 106 or vice versa. The item 108 can be any type of material, for instance, but not limited to fabric, rubber, plastic, metal, composite or wood. The item 108 can also be of any suitable shape for instance a planar, curved, or irregular shape. Virtually any type of material could be picked up by the system 100.

Figure 2:
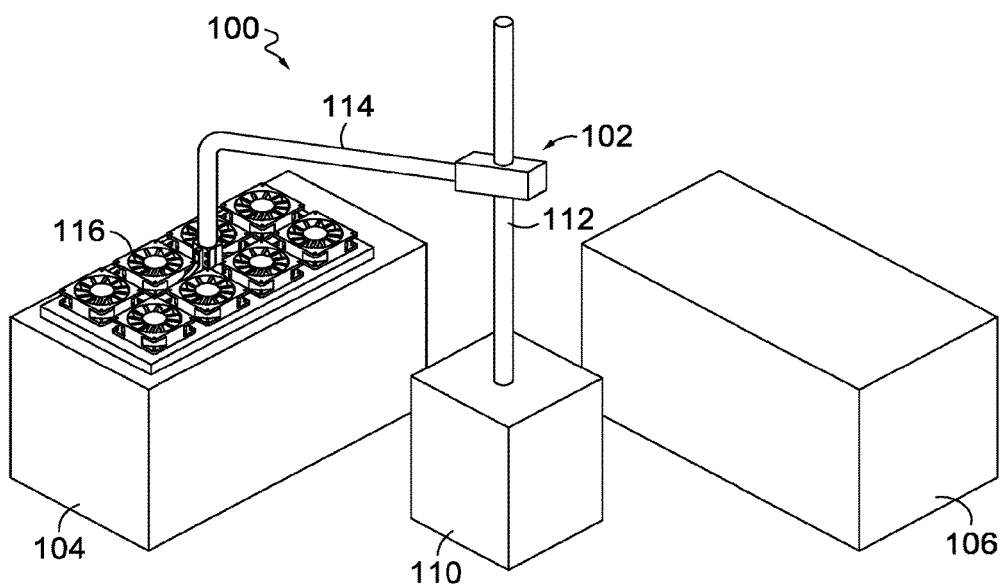
FIG. 2 depicts the exemplary pick up system of FIG. 1 in a second position picking up an item, in accordance with exemplary aspects hereof.

The mechanical arm 102 includes a base 110 and a shaft 112 rotatably mounted thereto. The shaft 112 also includes a positioning rod 114 movable in an up and down manner. Positioned at the end of the rod 114 is a pick up head assembly 116, which will be further described below in more detail. The pick up head assembly 116 is used to apply a suction force to the item 108 such that the item 108 is engaged with the assembly 116 for movement from the manufacturing location 104 to the manufacturing location 106. More specifically, with reference to FIG. 2, the rod 114 is moved downwardly at the location 104 so that the head assembly 116 engages the item 108. At this point, a suction force is applied via the head assembly 116 such that the item 108 is temporarily attached to the head assembly 116.

Figure 3:
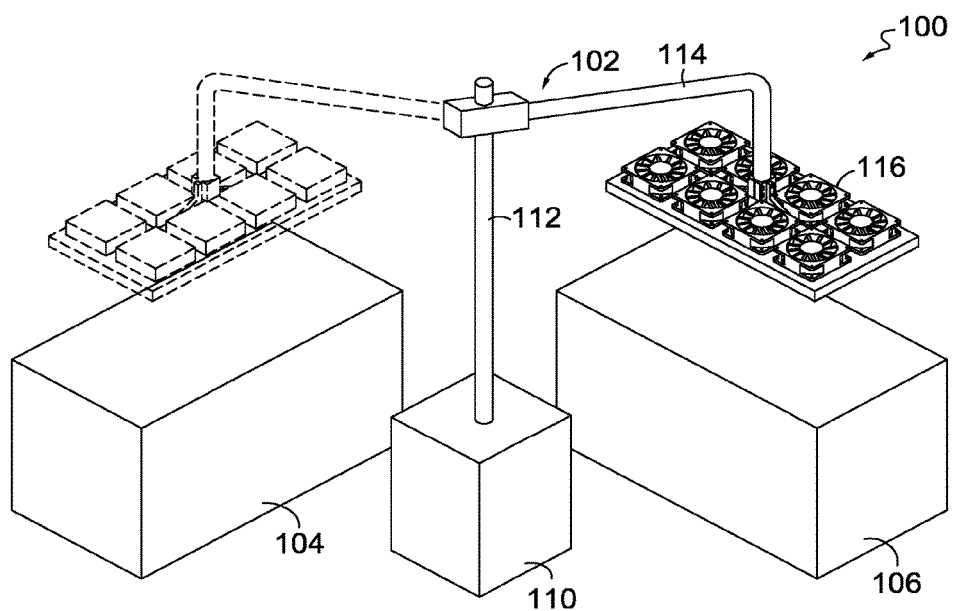
FIG. 3 depicts the exemplary pick up system of FIG. 1 in a third position moving the item between locations, in accordance with exemplary aspects hereof.
Figure 4:
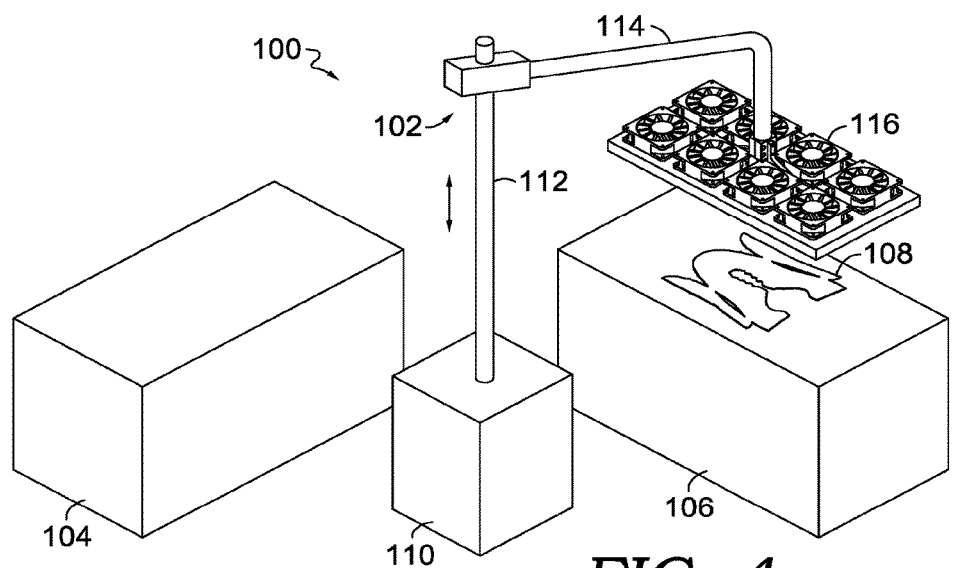
FIG. 4 depicts the exemplary pick up system of FIG. 1 in a fourth position releasing the item at a final location, in accordance with exemplary aspects hereof.
Figure 5:
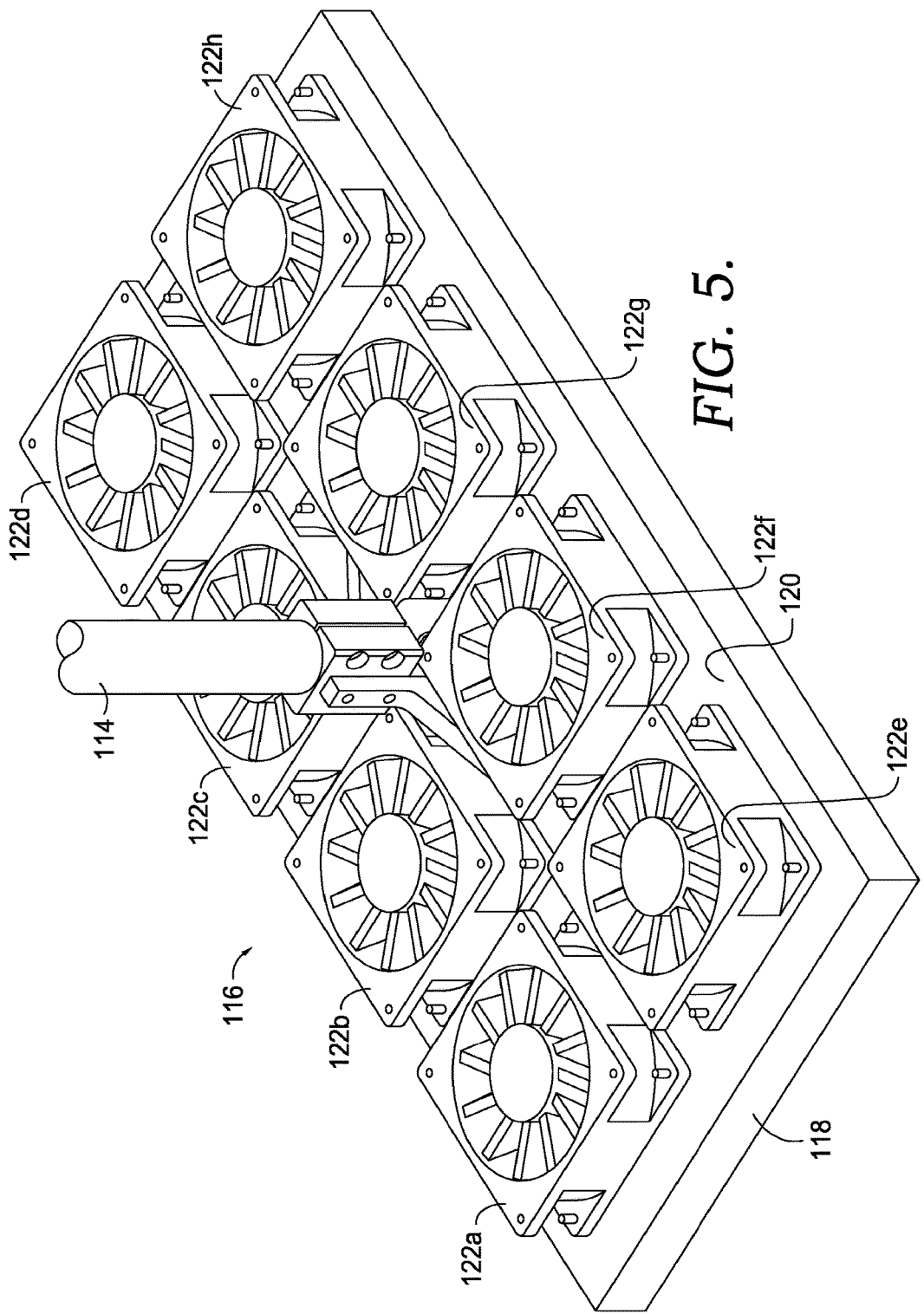
FIG. 5 depicts a perspective view of an exemplary pick up head having eight independently actuated zones, in accordance with exemplary aspects hereof.

As depicted in FIG. 3, the mechanical arm 102 with the head assembly 116 is then rotated from the first location 104 to the second location 106. Thereafter, as depicted in FIG. 4, the rod 114 is moved downwardly to position the head assembly 116 on the location 106. Thereafter, the suction force applied by the head assembly 116 is shut off or removed, thus resulting in the item 108 becoming disengaged from the head assembly 116 so as to remain at the location 106. In this manner, the item 108 can be relocated to different manufacturing positions during a manufacturing process.

As discussed above, one suitable manufacturing process in which the system 100 can be used is in the manufacturing of a shoe upper. A shoe upper can be comprised of multiple parts that are overlaid one on top of the other. For instance, difference types of materials may be used for the toe, sides and heel portions of the upper. Often, these particular different materials will need to be precisely placed and overlapped so that they can be later sewn or bonded together in any suitable manner.

Figure 6:
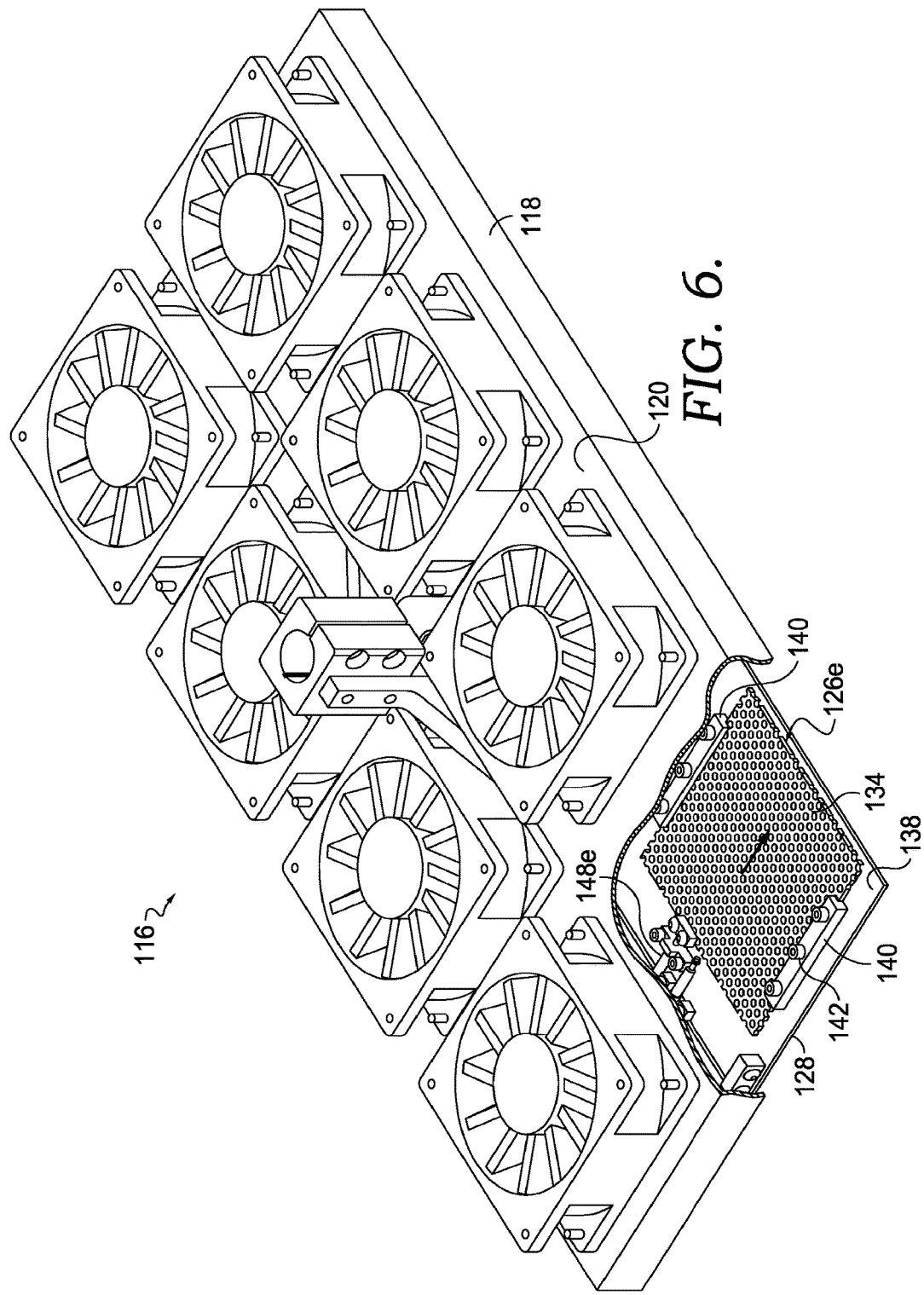
FIG. 6 depicts the exemplary pick up head of FIG. 5 with parts broken away to reveal details of construction, in accordance with exemplary aspects hereof.
Figure 7:
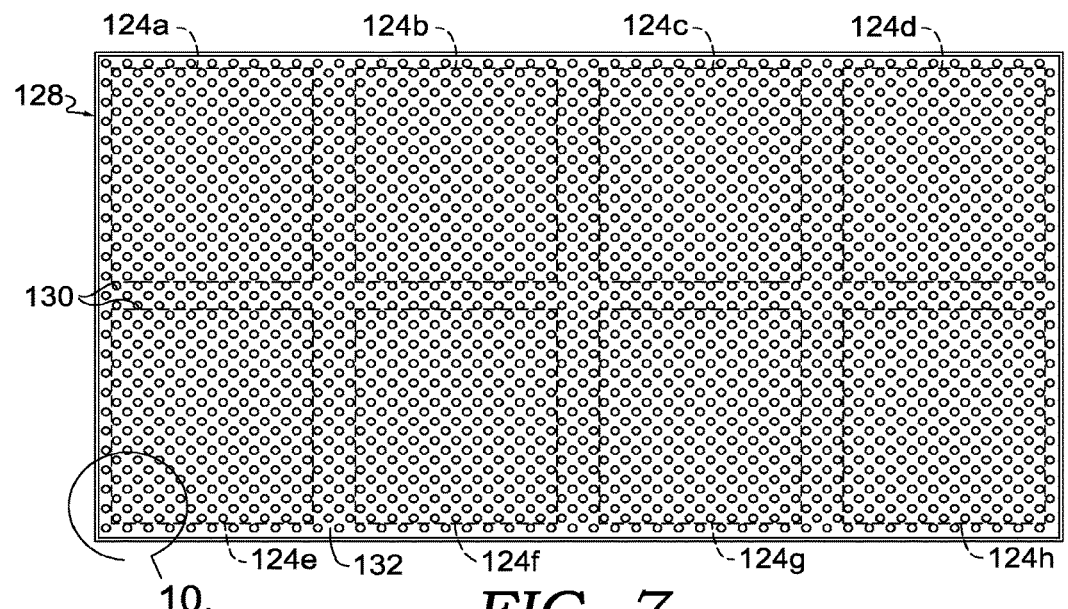
FIG. 7 depicts a bottom plan view of the pick up head of FIG. 5, in accordance with exemplary aspects hereof.

With reference to FIGS. 5-12, the pick up head assembly 116 will now be described. With specific reference to FIG. 5, the pick up head assembly 116 includes a housing 118 rotatably connected to the rod 114. The housing 118 includes an upper surface 120 which is connected to the rod 114. The upper surface 120 also includes a number of suction fans 122a-122h mounted thereto. Each of the fans 122a-122h is able to provide a suction/vacuum force to pick up an item 108. Further, each of the fans 122a-122h is associated with an independently actuatable pick up zone 124a-124h, as best depicted in FIG. 7. As will be more fully described below, each of these zones 124a-124h can be selectively actuated depending on the needs of the pick up system 100. For instance, depending on the item 108, it may only be necessary to actuate the suction force in the zones 124b and 124f via the fans 122b and 122f. As a further example, again depending on the shape, size and weight of the item 108, it may only be necessary to actuate the zones 124a, 124f, 124c, and 124h via the fans 122a, 122f, 122c, and 122h. Thus, as is apparent at any time, any one or all of the zones 124a-124h can be selectively actuated to accommodate any type of item 108.

Figure 8:
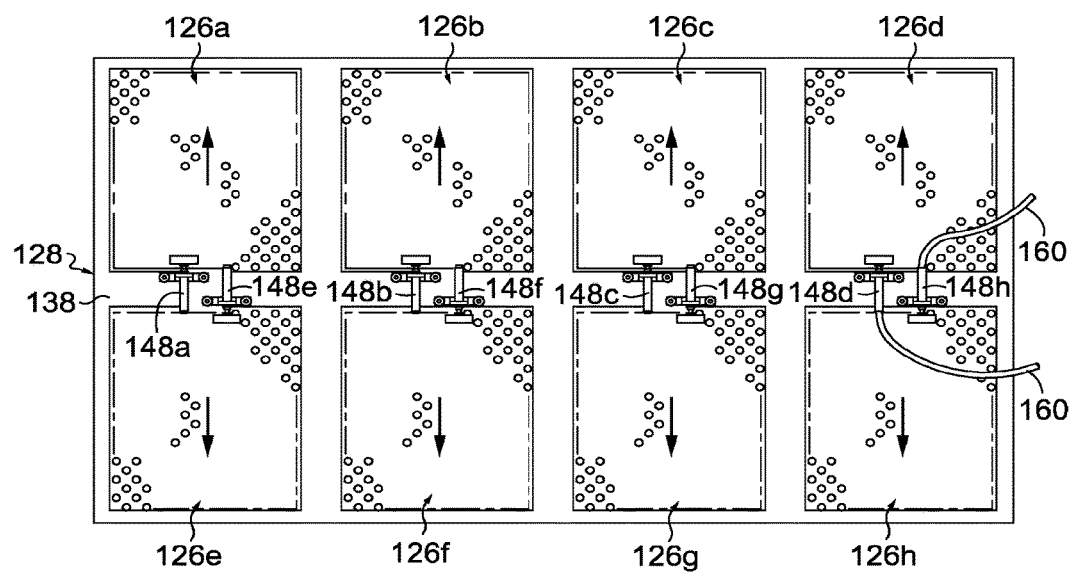
FIG. 8 depicts a top plan view of the engaging plate of the pick up head of FIG. 5 showing the blocking mechanisms for interrupting the suction force of the pick up head, in accordance with exemplary aspects hereof.

A constraint associated with the actuation of the fans 122a-122h is that when turning them on and off to provide a suction force, there is a lag force with the fans as they are powered down to allow the item 108 to disengage from the pick up assembly head 116. As will be more fully explained below, in order to address this lagging suction force associated with each of the zones 124a-124h, the zones 124 can be more precisely controlled with a plurality of suction blocking mechanisms 126a-126h as depicted in FIGS. 6 and 8.

With reference to FIGS. 6-11, the operation of the independently controllable blocking mechanisms 126a-126h will be described. The pick up head assembly 116 includes a generally planar engaging plate 128 positioned on the bottom of the housing 118. The engaging plate 128 includes a plurality of apertures 130 which allow the suction/vacuum force generated by the fans 122a-122h to engage the item 108. The engaging plate 128 includes a lower surface 132 for engaging the item 108. The plate 128 is depicted as being generally planar, but can be of any type of shape, for instance curved, angular or parabolic. The plate 128 is shaped to accommodate the shape and the resulting positioning of the item 108. The shape and contours of the plate 128 is limitless based upon the manufacturing process involving the item 108. The lower surface 132 directly engages the item 108. The apertures 130 allow the suction force generated by the fans 122a-122h to be applied directly to the item 108.

Figure 9:
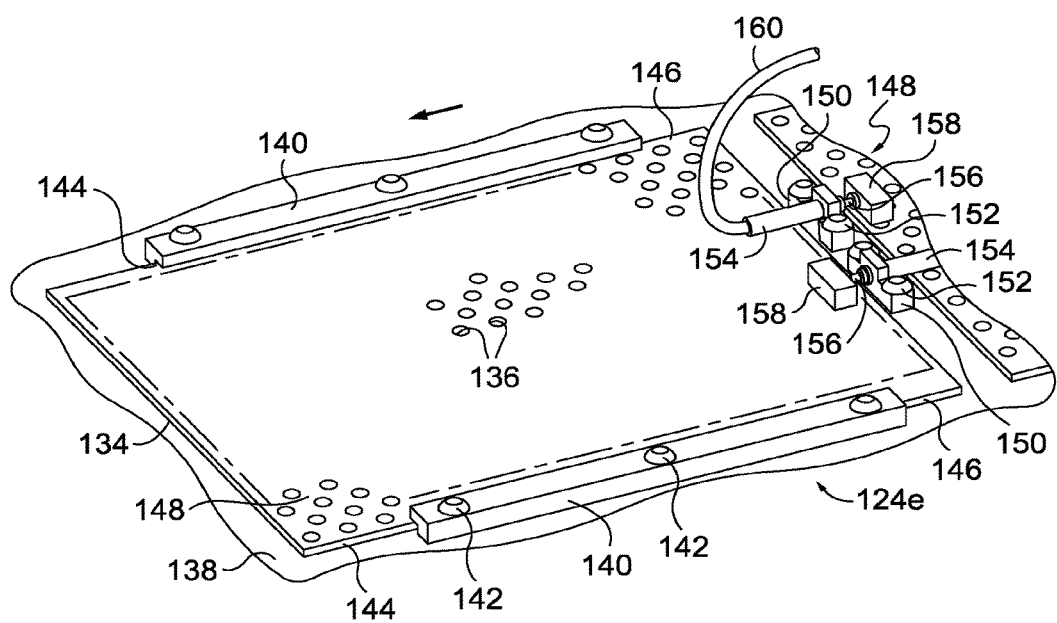
FIG. 9 depicts is a perspective view of one of the blocking mechanisms shown in FIG. 8, in accordance with exemplary aspects hereof.
Figure 10:
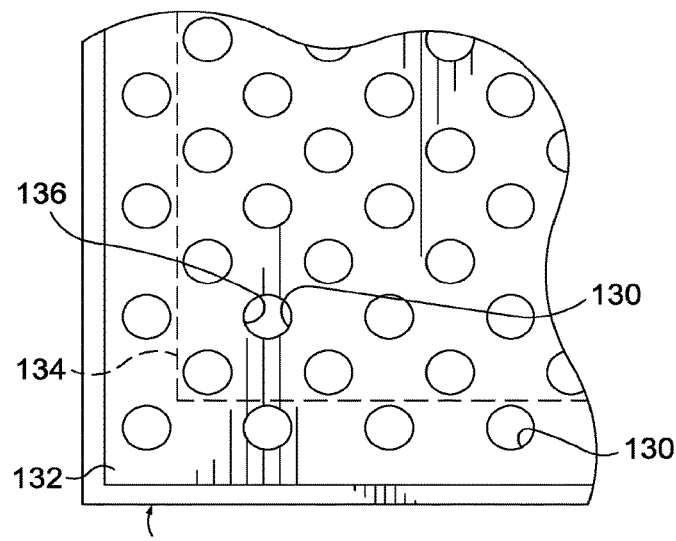
FIG. 10 depicts an enlarged view of the area 10 shown in FIG. 7 showing the apertures of the engaging plate and the apertures of the blocking mechanisms aligned with one another so that the suction force can act on the item, in accordance with exemplary aspects hereof.
Figure 11:
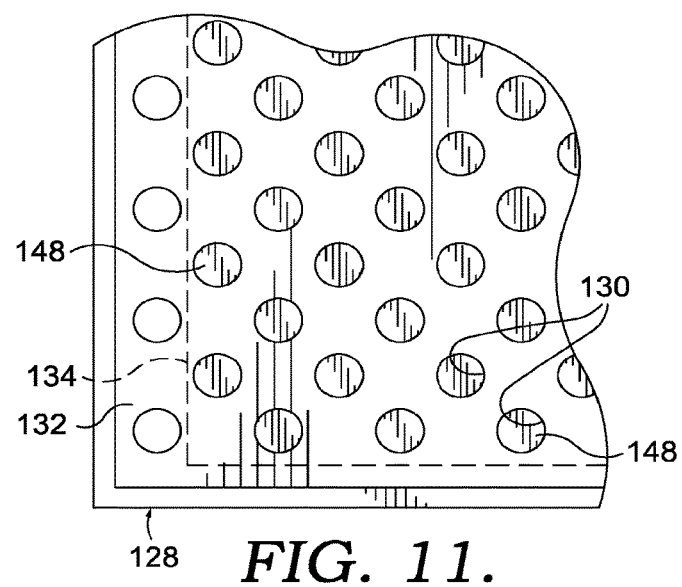
FIG. 11 depicts a view similar to FIG. 10 but showing the apertures of the engaging plate and the apertures of the blocking mechanisms offset so as to block the suction force, in accordance with exemplary aspects hereof.

With further discussion of the individually actuated blocking mechanisms 126a-126h, each blocking mechanism 126a-126h includes a flow interrupting plate 134. Each plate 134 includes a plurality of apertures 136 that are generally of the same shape and size as the apertures 130 in engaging plate 128 as depicted in FIGS. 10 and 11. With reference to FIG. 9, each interrupting plate 134 is slideably mounted to an upper surface 138 of the engaging plate 128 using slide rails 140. More specifically, each blocking mechanism 126 includes at least two of the rails 140 that are mounted to the upper surface 138 of engaging plate 128 by bolts or pins 142. This mounting arrangement creates a slot 144 into which the side edges 146 of the interrupting plate 134 are received. In this manner, the interrupting plate 134 can slide with respect to the upper surface 138.

With reference to FIG. 10, the alignment of the apertures 130 and the apertures 136 is shown such that a suction force generated by the respective fan 122e is allowed to act on the item 108. FIG. 10 shows a portion of the zone 124e of the engaging plate 128. The respective interrupting plate 134 of the blocking mechanism 126e is shown in dashed lines. As can be seen, the apertures 130 and the apertures 136 are in alignment to allow the flow of the suction force. This configuration is an "open" or "flow allowing" position of the zone 124e and the blocking mechanism 126e.

FIG. 11 depicts the misalignment of the apertures 130 and 136, so that the suction force generated by the fan 122e is interrupted by the plate 134. Again the respective interrupting plate 134 is shown in dashed lines. A solid surface 149 of the plate 134 that exists between the apertures 136 can be seen blocking the apertures 130. In this way, this configuration is a "closed" or "blocking" position of the zone 124e and the blocking mechanism 126e.

With reference to FIGS. 6, 8 and 9, the independently controllable actuators 148a-148h associated with the blocking mechanisms 126a-126h will be described. The actuators 148 are shown as pneumatic cylinders, but could be any other type of actuator capable of linear movement, for instance a hydraulic cylinder, a solenoid, or a mechanical linkage, etc. Each actuator 148 includes a base 150 mounted to the upper surface 138 of the engaging plate 128 via pins or bolts 152. The actuator 148 also includes a cylinder 154 having a moveable piston 156 disposed therein. Each piston 156 includes an attachment end 158 that is secured to the interrupting plate 134 by any suitable structure for instance a pin, adhesive or bolts, etc. The piston 156 is movable between a retracted position and an extended position. The retracted position corresponds to the "open" or "flow allowing" position of the zone 124 and the blocking mechanism 126 which is depicted in FIG. 10. The actuator 148 can be biased towards its retracted position by any suitable structure for instance a spring, a rubber band, a deflector plate, etc. This is especially helpful if the actuator 148 is powered in a single direction, for instance powered toward the extended position. More specifically, and for example, if the actuator 148 is a pneumatic actuator and has a single action cylinder 154, then the piston 156 will move to its extended position when air pressure is applied to the cylinder 154 via for instance an air supply hose 160. Because the cylinder 154 can be single action, a biasing structure is needed to return the piston 156 to its retracted position once air pressure is no longer supplied to the cylinder 154. The extended position of the piston 156 corresponds to the "closed" or "blocking" position of the zone 124 and the blocking mechanism 126 as depicted in FIG. 11.

Thus, for example, if no air pressure is applied to the cylinder 154, the piston 156 is held in its retracted position by a biasing structure associate with the cylinder 154. This unactuated state of the cylinder 154 results in the apertures 130 of the engaging plate 128 being in alignment with the apertures 136 of the interrupting plate 134. This is the "open" position of the blocking mechanism 126 which allows any suction force generated by the fans 122 to be applied to the item 108 through the aligned apertures 130, 136 as shown in FIG. 10. The cylinders 154 are depicted in their retracted positions in FIGS. 6, 8, 9 and 10 which corresponds to the "open" position of the respective zone 124.

If air pressure is applied to the cylinder 154 via the hose 160, the piston 156 is extended such that the interrupting plate 134 slides linearly as depicted in FIG. 11 (and as depicted by the direction of the arrows in FIGS. 6, 8, and 9) into a position where apertures 130 and 136 are no longer aligned. Therefore, the interrupting plate 134 obstructs the apertures 130 of the engaging plate 128, and thus, obstructs the flow of the suction force applied to the item 108. This extended position of the piston 156 corresponds to the "closed" or "blocking" position of the interrupting plate 134 and thus, the blocking mechanism 126.

As is apparent, the structures described above, result in the ability to independently activate any of the zones 124a-124h. The blocking mechanisms 126a-126h associated with each of these zones are normally in the "open" position to allow the suction force to be applied to item 108. Thus, any combination of the fans 122a-122h can be activated to provide a customized suction pick up force associated with the individual zones 124a-124h. The item 108 is in contact with the engaging plate 128 when the appropriate combination of the fans 122 is activated. The fans 122 remain activated as the pick up head assembly 116 is moved by the mechanical arm 102 from the first manufacturing location 104 to the second manufacturing location 106. Once the assembly 116 is positioned at the proper location at the manufacturing location 106, the appropriate corresponding blocking mechanisms 126a-126h are actuated to interrupt the suction force associated with the corresponding fans 122a-122h. This interruption of the suction force results in the item being precisely placed at the second manufacturing location 106. At the same time the blocking mechanisms 126 are actuated, the corresponding fans 122 are also deactivated. As discussed above, the deactivation of the fans 122 results in a lagging decreasing suction force. This type of lagging decrease in force can result in misplacement of the item 108 due to delayed release. Still further, waiting on the fans 122 to slow down enough to result in disengagement of the item 108 results in inefficiencies and delays. Use of the blocking mechanisms 126 results in more precise and efficient positioning.

Figure 12:
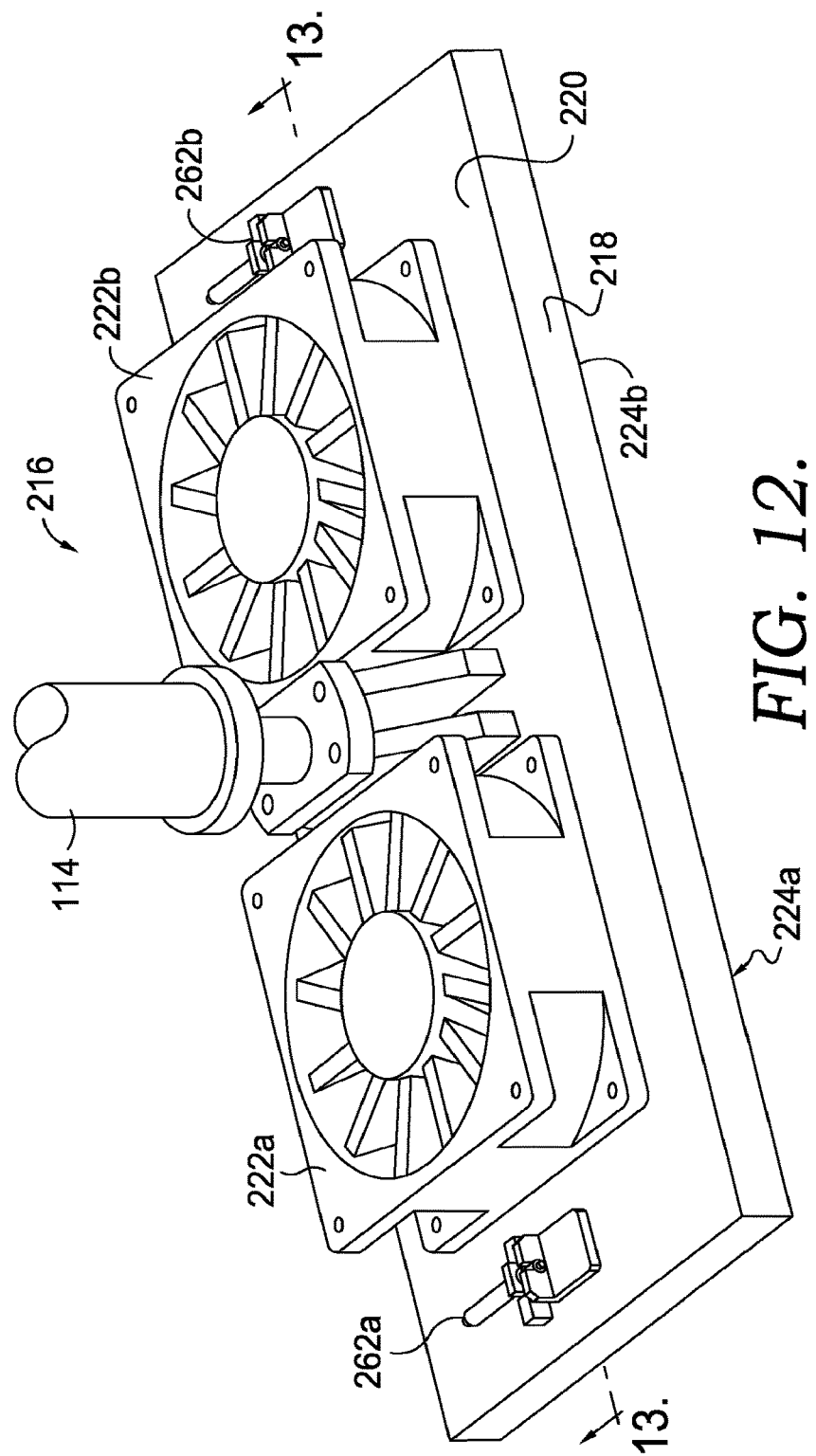
FIG. 12 depicts a perspective view of an exemplary pick up head having two independently actuated zones, in accordance with exemplary aspects hereof.
Figure 13:
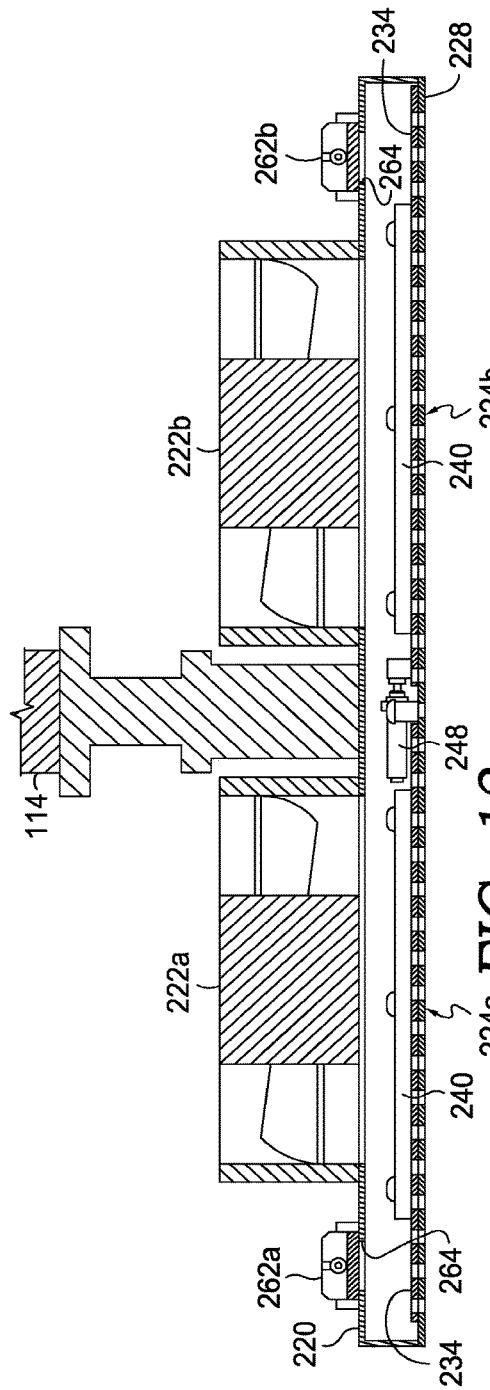
FIG. 13 depicts a cross section taken along line 13-13 of FIG. 12, in accordance with exemplary aspects hereof.
Figure 14:
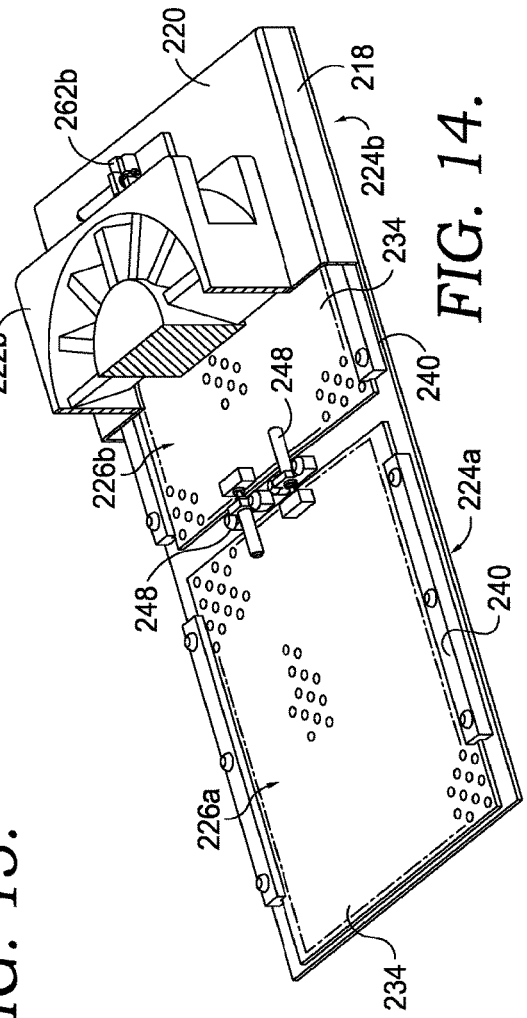
FIG. 14 depicts a perspective view of the exemplary pick up head of FIG. 12 with parts broken away to reveal details of construction, in accordance with exemplary aspects hereof.

With reference to FIG. 12, an exemplary pick up head assembly 216 is depicted in accordance with aspects hereof. The pick up head assembly 216 can be used in the system 100 in place of the pick up assembly 116. More specifically, the head assembly 216 can be positioned on the end of the rod 114 in place of the head assembly 116. The head assembly 216 is different from the head assembly 116 in that it has only two independently actuatable zones 224a and 224b verses eight zones 124a-124h. When used in the system 100 of FIG. 1, the head assembly 216 operates in a similar manner to the head assembly 116, in that it is used to move an item 108 from a first manufacturing location 104 to a second manufacturing location 106.

The head assembly 216 has many structures that are the same as and operate in the same manner as the structures in the head assembly 116. More specifically, the head assembly 216 includes a housing 218 that has fans 222a and 222b mounted thereon to supply the suction force to the zones 224a and 224b. The head assembly 216 also includes an engaging plate 228 and blocking mechanisms 226a and 226b that operate in the same manner as blocking mechanisms 126a-126h. Each blocking mechanism includes an interrupting plate 234 that operates in the same manner as the interrupting plate 134 and an actuator 248 that operates in the same manner as the actuator 148. Each interrupting plate 234 is slideably mounted with the engaging plate 228 using slide rails 240.

Thus, the head assembly 216 operates similar to the pick up assembly 116 in that in order to move an item 108, one or both of zones 224a and 224b are activated by activating the corresponding fans 222a and 222b to create a suction force. The blocking mechanisms 226a and 226b are in the "open" position to allow the suction force to be applied to the item 108. This "open" position exists when no air pressure is applied to the blocking mechanisms 226 and they are biased towards this "open" position. Once head assembly 216 is at the appropriate manufacturing location and it is time to release the item 108, one or both of the blocking mechanisms 226a and 226b are actuated by the application of air pressure. This results in the blocking mechanisms 226 moving to their "closed" or "interrupting" positions, thus resulting in the release of the item 108.

Figure 15:
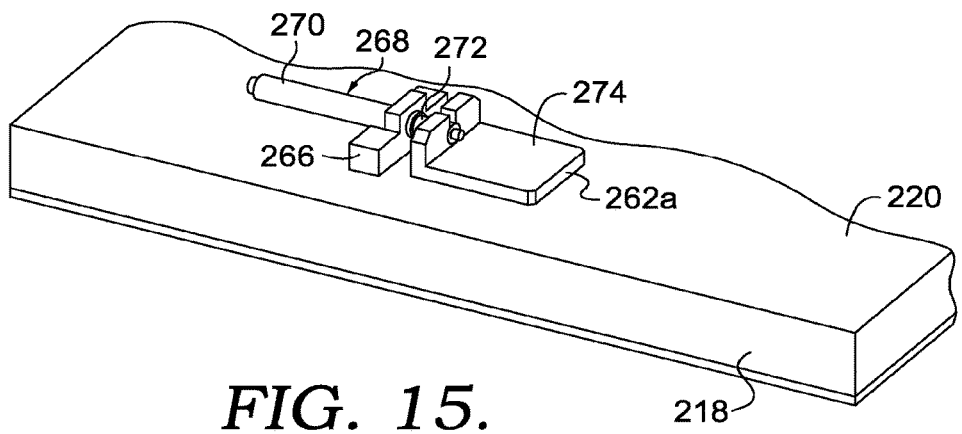
FIG. 15 depicts a perspective view of a bypass aperture structure of the pick up head shown in FIG. 12 with the bypass aperture structure in the closed position, in accordance with exemplary aspects hereof.
Figure 16:
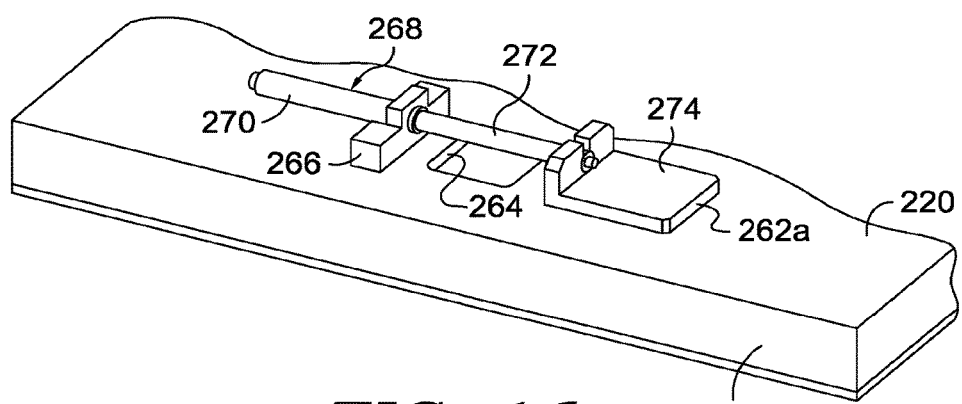
FIG. 16 depicts a perspective view of the bypass aperture structure of FIG. 15 with the bypass aperture structure in the open position, in accordance with exemplary aspects hereof.

With reference to FIGS. 12, 15 and 16, the pick up head assembly 216 includes two bypass aperture structures 262a and 262b that were not depicted in the pick up head assembly 116. The bypass structures 262 could easily also be incorporated into the pick up head assembly 116 as will be readily become apparent from the below discussion.

The purpose of bypass structures 262 is to allow air to be supplied to the fans 222a and 222b when the blocking mechanisms 226a and 226b are in their "closed" or "flow interrupting" positions. The bypass structures 262 provide this function by opening a bypass aperture 264 in the top surface 220 of the housing 218 as shown in FIG. 16 when the blocking mechanisms 226 are in their "closed" positions. This allows air to be drawn into the housing 218 through bypass apertures 264 such that the air can flow through the fans 222 to prevent unwanted stresses on the fans 222 and quickly reducing the amount of suction force directed toward the zones 224a and 224b.

With reference to FIGS. 15 and 16, the operation of the bypass structures 262 will be described. Each bypass structure 262 includes a mount 266 secured to the housing 218. The mount 266 has an actuator 268 mounted thereto. The actuator 268 can be a pneumatic cylinder 270 having a piston 272 that extends when air pressure is applied. Still further, the piston 272 can be biased to a retracted position by a suitable structure such as a spring, rubber band, or deflecting plate etc. At the end of the piston 272 is a closing flap 274 for opening and closing the bypass aperture 264. Thus, when no air pressure is applied to the cylinder 270 (as depicted in FIG. 15), the piston 272 is in its retracted position and, thus the flap 274 is covering the bypass aperture 264. This "closed" position of the bypass structure 262 occurs when the head assembly 216 is picking up the item 108 via the activation of the fans 222, and thus, the use of a suction force pulling upwards through the engaging plate 228.

Once it is desirable to disengage the item 108 from the head assembly 216, the blocking mechanisms 226a and 226b are actuated to their "closed" positions and at the same time the bypass structures 262a and 262b are actuate to their "open" positions to allow air to flow through the bypass apertures 264 into the housing 218. By allowing air into the housing 218 when the blocking mechanisms 226 are closed, there is a much quicker reduction in suction forces and also a reduction in stress on the fans 222.

Figure 17:
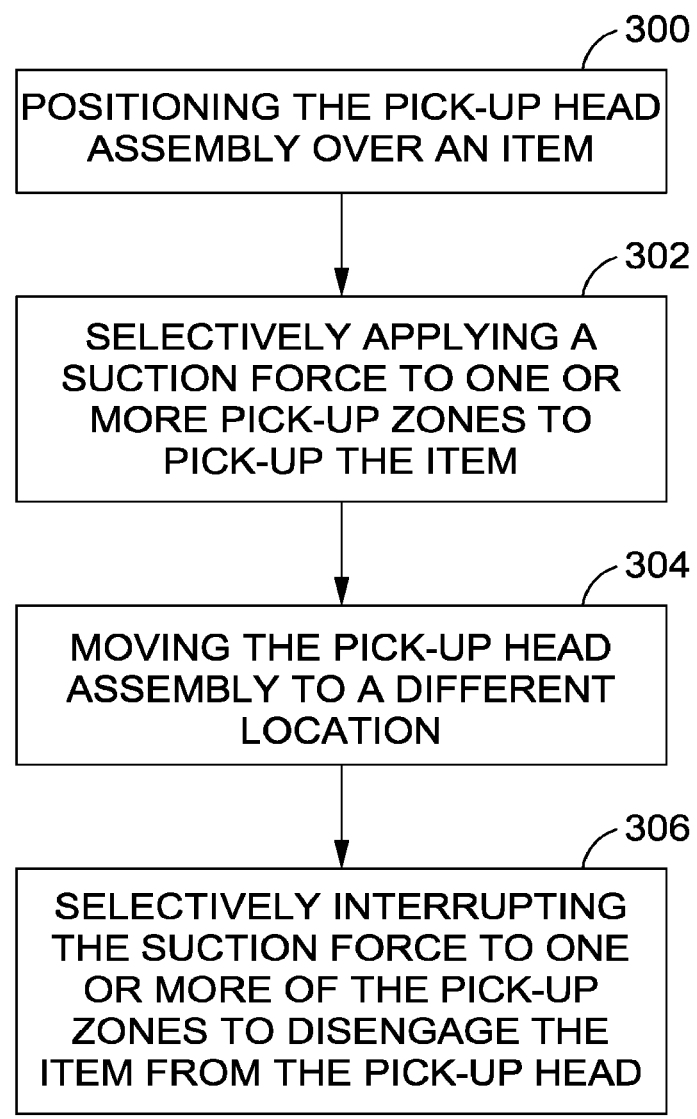
FIG. 17 depicts an exemplary method of moving an item from one location to another location, in accordance with exemplary aspects hereof.

With reference to FIG. 17, a method of picking up an item for positioning from one location to another location using a pick up head assembly 116 having a plurality of pickup zones 124 and a vacuum mechanism (e.g., fans 122) is described. At block 300, the pick up head assembly is positioned over an item. At block 302, a suction force is selectively applied to one or more of the pickup zones to pick up the item. At block 304, the pick up head assembly is moved to a different location. At block 306, the suction force is selectively interrupted to one or more of the pick up zones to disengage the item.

From the foregoing, it will be seen that this invention is one well-adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. An apparatus for picking up and positioning an item comprising:
   a vacuum assembly capable of applying a suction force to the item;
   an engaging plate positioned adjacent the vacuum assembly and having a first plurality of apertures formed therein such that the suction force can be applied to the item through the first plurality of apertures; and
   a blocking member positioned adjacent the engaging plate and capable of interrupting the suction force flowing through the first plurality of apertures of the engaging plate, wherein the blocking member is positionable in a first position allowing the item to be picked up and a second position interrupting the suction force to assist disengagement of the item from the engaging plate, wherein the blocking member is a plate slideably mounted adjacent the engaging plate, and wherein the blocking member has a second plurality of apertures that at least substantially align with the first plurality of apertures of the engaging plate when the blocking member is in the first position and that are at least substantially out of alignment with the first plurality of apertures of the engaging plate when the blocking member is in the second position.

2. The apparatus of claim 1, wherein the vacuum assembly includes a fan for creating the suction force.

3. The apparatus of claim 1, wherein the engaging plate is generally planar.

4. The apparatus of claim 1, wherein the engaging plate mimics the shape of the item.

5. The apparatus of claim 1, wherein the engaging plate defines a plurality of pick up zones and wherein each pick up zone has an actuatable blocking member associated therewith such that each pick up zone can be individually activated.

6. The apparatus of claim 5, wherein each pick up zone has a fan associated therewith to provide suction force for at least the specific pick up zone.

7. The apparatus of claim 1, further comprising an actuator connected to the blocking member to move the blocking member between the first position and the second position.

8. The apparatus of claim 7, wherein the actuator is a pneumatic cylinder.

9. The apparatus of claim 1, further comprising a shroud that connects the vacuum assembly to the engaging plate, wherein the shroud generally encases a surface of the engaging plate that is opposite to a surface of the engaging plate that contacts the item.

10. The apparatus of claim 9, wherein the shroud includes at least one bypass aperture for allowing air to flow through the vacuum assembly when the blocking member is in the second position.

11. The apparatus of claim 10, further comprising an actuatable flap for covering and uncovering the bypass aperture and wherein the flap closes the bypass aperture when the blocking member is in the first position and opens the bypass aperture when the blocking member is in the second position.

12. The apparatus of claim 11, further comprising a pneumatic cylinder for opening and closing the flap.

13. The apparatus of claim 1, further comprising a robotic arm coupled to the vacuum assembly and for moving the item from one location to another location.

14. An apparatus for moving an item from one location to another location comprising:
   a mechanical arm capable of moving from one location to another;
   a pick up head coupled to the mechanical arm and capable of engaging and disengaging the item, the pick up head including:
   an engaging plate for directly contacting the item, wherein the engaging plate is divided into a plurality of independently actuated pick up zones and wherein each zone has a first plurality of apertures formed therein;
   a vacuum mechanism capable of providing a suction force to each of the pick up zones; and
   a plurality of independently actuated blocking members, wherein each blocking member is associated with one of the pick up zones and wherein each blocking member is capable of being independently actuated between an open position allowing the suction force to pass through the respective zone and a closed position interrupting the suction force at the respective zone, wherein each blocking member comprises a second plurality of apertures, and wherein, when in the open position, the second plurality of apertures at least substantially align with the first plurality of apertures of an associated pick up zone, and, when in the closed position, the second plurality of apertures are at least substantially out of alignment with the first plurality of apertures of the associated pick up zone.

15. The apparatus of claim 14, wherein the engaging plate is generally planer and wherein the blocking members are plates that are slideably mounted to the engaging plate so as to slide between the open position and the closed position.

16. The apparatus of claim 14, wherein the vacuum mechanism includes a plurality of fans and wherein each pick up zone has a fan associated therewith.

17. The apparatus of claim 14, wherein the engaging plate mimics the shape of the item.

18. The apparatus of claim 14, further comprising a shroud that connects the vacuum mechanism to the engaging plate, wherein the shroud generally encases a surface of the engaging plate that is opposite to a surface of the engaging plate that contacts the item and wherein the shroud includes at least one bypass aperture for allowing air to flow through the vacuum mechanism when at least one of the blocking members is in the closed position.

19. A method of picking up an item for positioning from one location to another location using a pick up head having a plurality of pick up zones and a vacuum mechanism, the method comprising:

selectively applying a suction force to one or more of the pick up zones to pick up the item, wherein each of the one or more pick up zones comprises a first plurality of apertures formed therein; and selectively interrupting the suction force to one or more of the pick up zones to disengage the item from the pick up head, wherein the interrupting of the suction force is from a blocking member positioned adjacent an engaging plate and capable of interrupting a suction force flowing through the first plurality of apertures of the engaging plate, wherein the blocking member comprises a second plurality of apertures, wherein, when the selectively applying the suction force occurs, the second plurality of apertures of the blocking member are at least substantially aligned with the first plurality of apertures of the engaging member, and, when the selectively interrupting the suction force occurs, the second plurality of apertures of the blocking member are at least substantially out of alignment with the first plurality of apertures of the engaging plate.

\* \* \* \* \*